(12) United States Patent
Li et al.

(10) Patent No.: US 12,279,655 B2
(45) Date of Patent: Apr. 22, 2025

(54) CHARGING CASE

(71) Applicant: LUXSHARE PRECISION INDUSTRY CO., LTD., Shenzhen (CN)

(72) Inventors: Huabing Li, Shenzhen (CN); Zhongyuan Lai, Shenzhen (CN); Yu Huang, Shenzhen (CN); Zhexian Tianzhou, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 585 days.

(21) Appl. No.: 17/692,477

(22) Filed: Mar. 11, 2022

(65) Prior Publication Data
US 2022/0338554 A1 Oct. 27, 2022

(30) Foreign Application Priority Data
Apr. 22, 2021 (CN) .......................... 202110436786.1

(51) Int. Cl.
*A24F 40/95* (2020.01)
(52) U.S. Cl.
CPC .................................... *A24F 40/95* (2020.01)
(58) Field of Classification Search
CPC ....................................................... A24F 40/95
USPC ......................................................... 320/115
See application file for complete search history.

(56) References Cited

U.S. PATENT DOCUMENTS

| 10,371,196 B1* | 8/2019 | Zaloom .................. F16M 11/38 |
| 2007/0036350 A1* | 2/2007 | Duan .................. H04M 1/0216 |
| | | 455/575.1 |
| 2007/0155418 A1* | 7/2007 | Shau .................. H04M 1/66 |
| | | 455/550.1 |

(Continued)

FOREIGN PATENT DOCUMENTS

| CN | 205198183 U | 5/2016 |
| CN | 205911765 U | 1/2017 |

(Continued)

OTHER PUBLICATIONS

Chinese Office Action and Search Report for Chinese Application No. 202110436786.1, dated Sep. 5, 2022, with an English translation.

*Primary Examiner* — Jack Chiang
*Assistant Examiner* — Suchin Parihar
(74) *Attorney, Agent, or Firm* — Birch, Stewart, Kolasch & Birch, LLP

(57) ABSTRACT

The charging case includes a cover, a case body and a connection assembly. The case body is provided with a charging recess. The connection assembly includes connection protrusions and a rotation shaft. The connection protrusions are disposed on one of the cover or the case body, and the other of the cover or the case body is provided with a first groove and a second groove. The connection protrusions are rotatably disposed in the first groove, and the connection protrusions are provided with through holes respectively. An end of the rotation shaft passes through a respective though hole. The middle of the rotation shaft is provided with a bump. A part of the middle of the rotation shaft is rotatably disposed in the second groove, where the part of the middle of the rotation shaft is not provided with the bump. The bump is located outside the second groove.

15 Claims, 8 Drawing Sheets

(56) References Cited

U.S. PATENT DOCUMENTS

| | | | | |
|---|---|---|---|---|
| 2011/0218502 A1* | 9/2011 | Iio | .................... | A61B 5/150305 |
| | | | | 320/108 |
| 2013/0342157 A1* | 12/2013 | Liu | ........................ | A24F 40/95 |
| | | | | 320/107 |
| 2015/0351271 A1* | 12/2015 | Dawson | ................ | B65D 51/28 |
| | | | | 220/521 |
| 2017/0026498 A1* | 1/2017 | Goldfain | .............. | A45C 11/182 |
| 2017/0259424 A1* | 9/2017 | Vetter | ................... | H02J 7/0044 |
| 2020/0412143 A1 | 12/2020 | Chang | | |
| 2021/0167630 A1* | 6/2021 | Zhao | .................... | H02J 50/005 |
| 2021/0345742 A1* | 11/2021 | Wright | .................. | A45C 11/00 |
| 2022/0231523 A1* | 7/2022 | Bristol | ................. | H02J 7/0042 |

FOREIGN PATENT DOCUMENTS

| | | |
|---|---|---|
| CN | 107968335 A | 4/2018 |
| CN | 207994690 U | 10/2018 |
| CN | 208956272 U | 6/2019 |
| CN | 110279154 A | 9/2019 |
| CN | 211268646 U | 8/2020 |
| CN | 111903030 A | 11/2020 |
| CN | 112089117 A | 12/2020 |

\* cited by examiner

CHARGING CASE

CROSS-REFERENCE TO RELATED APPLICATION(S)

This application claims priority to Chinese Patent Application No. 202110436786.1 filed Apr. 22, 2021, the disclosure of which is incorporated herein by reference in its entirety.

TECHNICAL FIELD

The present disclosure relates to the technical field of charging technologies and, in particular, to a charging case.

BACKGROUND

An electronic-cigarette charging case can not only be used for charging an electronic cigarette, but also can accommodate the electronic cigarette, so as to prevent the electronic cigarette from being polluted.

In the related art, an electronic-cigarette charging case includes a case body and a cover rotatably connected to the case body through a hinge structure. A charging compartment for accommodating an electronic cigarette is disposed in the case body. When the electronic cigarette is located in the charging compartment, a charging terminal inside the charging compartment can charge the electronic cigarette. Currently, to facilitate the rotation of the cover relative to the case body, a free gap needs to be left both between the hinge structure and the cover and between the hinge structure and the case body, resulting in a large gap between the cover and the case body. Thus, when the cover covers the case body, impurities in the air such as dust are easier to enter the electronic-cigarette charging case. Consequently, the electronic cigarette inside the charging compartment is polluted.

Hence, an electronic-cigarette charging case that can prevent a mismatch when a cover covers a case body is urgently needed.

SUMMARY

The present disclosure provides a charging case with a small gap between a cover and a case body so that the possibility that dust enters the charging case can be reduced and thus the cleanness of an object inside the charging case can be ensured.

The present disclosure provides the solutions described below.

A charging case includes a cover, a case body and a connection assembly. The case body is provided with a charging recess. The connection assembly is provided with connection protrusions and a rotation shaft. The connection protrusions are disposed on one of the cover or the case body, and the other of the cover or the case body is provided with a first groove and a second groove. The connection protrusions are rotatably disposed in the first groove, and the connection protrusions are provided with through holes respectively. Each end of the rotation shaft passes through a respective one of through holes. Moreover, the middle of the rotation shaft is provided with a bump. A part of the middle of the rotation shaft is rotatably disposed in the second groove, where the part of the middle of the rotation shaft is not provided with the bump. The bump is located outside the second groove.

Optionally, the first groove and the second groove are disposed at a first edge of the cover. A part of the first edge is provided with an arced protrusion, where the part of the first edge is not provided with the first groove and the second groove. The connection protrusions are disposed at a second edge of the case body. The second edge is provided with an arced groove. The arced protrusion is located in the arced groove.

Optionally, an edge of the cover is provided with a first guide structure and an edge of the case body is provided with a second guide structure which matches the first guide structure. When the cover covers the case body, the second guide structure can guide the first guide structure.

Optionally, the first guide structure is secured to an inner wall surface of the cover along a circumferential direction of the cover and is provided with a first inclined surface facing the center of the cover.

Optionally, a top edge of the case body is provided with a second inclined surface which forms the second guide structure. When the cover covers the case body, the first inclined surface slides on the second inclined surface.

Optionally, a shockproof layer secured to an inner wall of the cover is further included. The shockproof layer bypasses the first guide structure. Moreover, the thickness of the shockproof layer is greater than or equal to the thickness of the first guide structure.

Optionally, one of the cover or the case body is provided with a reset protrusion, and the other of the cover or the case body is provided with a reset groove capable of accommodating the reset protrusion. An outer side surface of the reset protrusion and an inner sidewall surface of the reset groove are each an inclined surface. When the reset protrusion is located in the reset groove, the outer side surface of the reset protrusion contacts the inner sidewall surface of the reset groove.

Optionally, the reset protrusion is ringlike. The charging case further includes a first magnetic block disposed in the reset protrusion and a second magnetic block secured to the case body or the cover. The first magnetic block is attractable to the second magnetic block.

Optionally, the case body is further provided with a disinfection recess.

Optionally, a charging assembly disposed in the case body is further included. The charging assembly includes a circuit board, a battery module, a wireless charging module and a charging terminal. The battery module, the wireless charging module and the charging terminal are electrically connected to the circuit board. Moreover, the charging terminal is secured to the charging recess.

Figure 1:
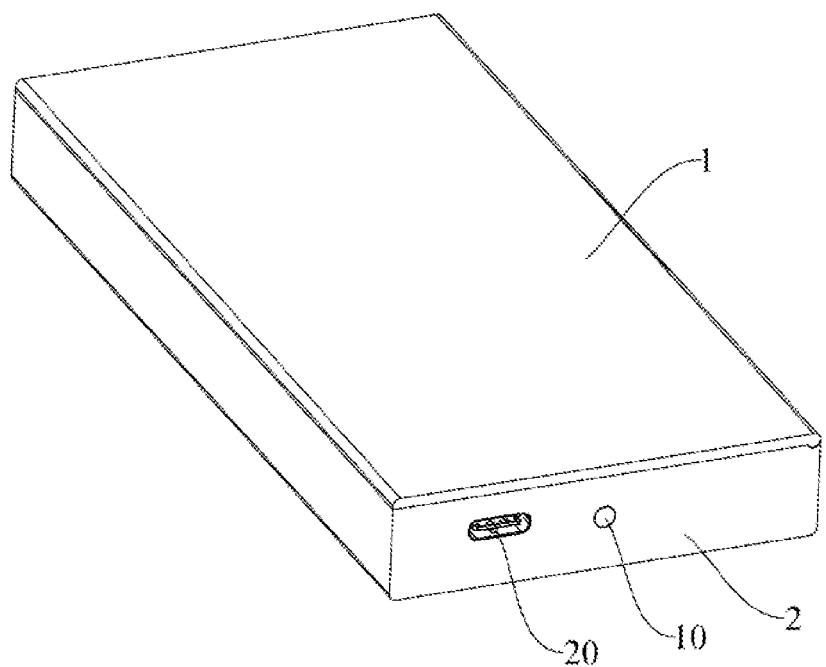
FIG. 1 is a schematic view of a charging case that is closed according to embodiments of the present disclosure.

REFERENCE LIST 1 cover
11 arced protrusion
12 first guide structure
121 first inclined surface
2 case body
21 charging recess
22 arced groove
23 second guide structure
24 disinfection recess
25 shell
26 inner case
3 connection assembly
31 first groove
32 second groove
33 connection protrusion
331 through hole
34 rotation shaft
341 bump
35 third groove
4 shockproof layer
5 reset protrusion
51 outer side surface
6 reset groove
61 inner sidewall surface
7 first magnetic block
8 second magnetic block
9 charging assembly
91 circuit board
92 wireless charging module
93 charging terminal
10 working indicator lamp
20 charging connector
30 electronic cigarette rod
40 cartridge

DETAILED DESCRIPTION

The technical solutions of the present disclosure are further described hereinafter in conjunction with drawings and embodiments. It is to be understood that the embodiments described herein are intended to illustrate. Additionally, it is to be noted that for ease of description, only a part, not all, related to the present disclosure is illustrated in the drawings.

In the description of the present disclosure, it is to be noted that orientations or position relations indicated by terms such as "center", "upper", "lower", "left", "right", "vertical", "horizontal", "in", and "out" are based on the drawings. These orientations or position relations are intended only to facilitate and simplify the description of the present disclosure and not to indicate or imply that a device or element referred to must have such particular orientations or must be configured or operated in such particular orientations. Moreover, terms such as "first" and "second" are used only for the purpose of description and are not to be construed as indicating or implying relative importance.

In the description of the present disclosure, it is to be noted that terms "mounted", "joined" and "connected" are to be construed in a broad sense unless otherwise expressly specified and limited. For example, the term "connected" may refer to "securely connected", "detachably connected", may refer to "mechanically connected" or "electrically connected" or may refer to "connected directly", "connected indirectly through an intermediary" or "connected inside two components". For those of ordinary skill in the art, meanings of the preceding terms in the present disclosure may be understood based on situations.

When a charging case provided in the present embodiments is closed, a gap between a cover and a case body can be relatively small so that the possibility that dust enters the charging case can be reduced and thus the cleanness of an object inside the charging case can be ensured. In some embodiments, the charging case may be an electronic-cigarette charging case. At this time, the object inside the charging case may be an electronic cigarette rod 30.

As shown in FIGS. 1 to 10, the charging case includes a cover 1, a case body 2 and a connection assembly 3 for connecting the case body 1 to the cover 2.

The cover 1 is sheet-shaped which matches the shape of the case body 2. A surface of the case body 2 for contacting the cover 1 is provided with a charging recess which is used for accommodating an object to be charged.

Figure 3:
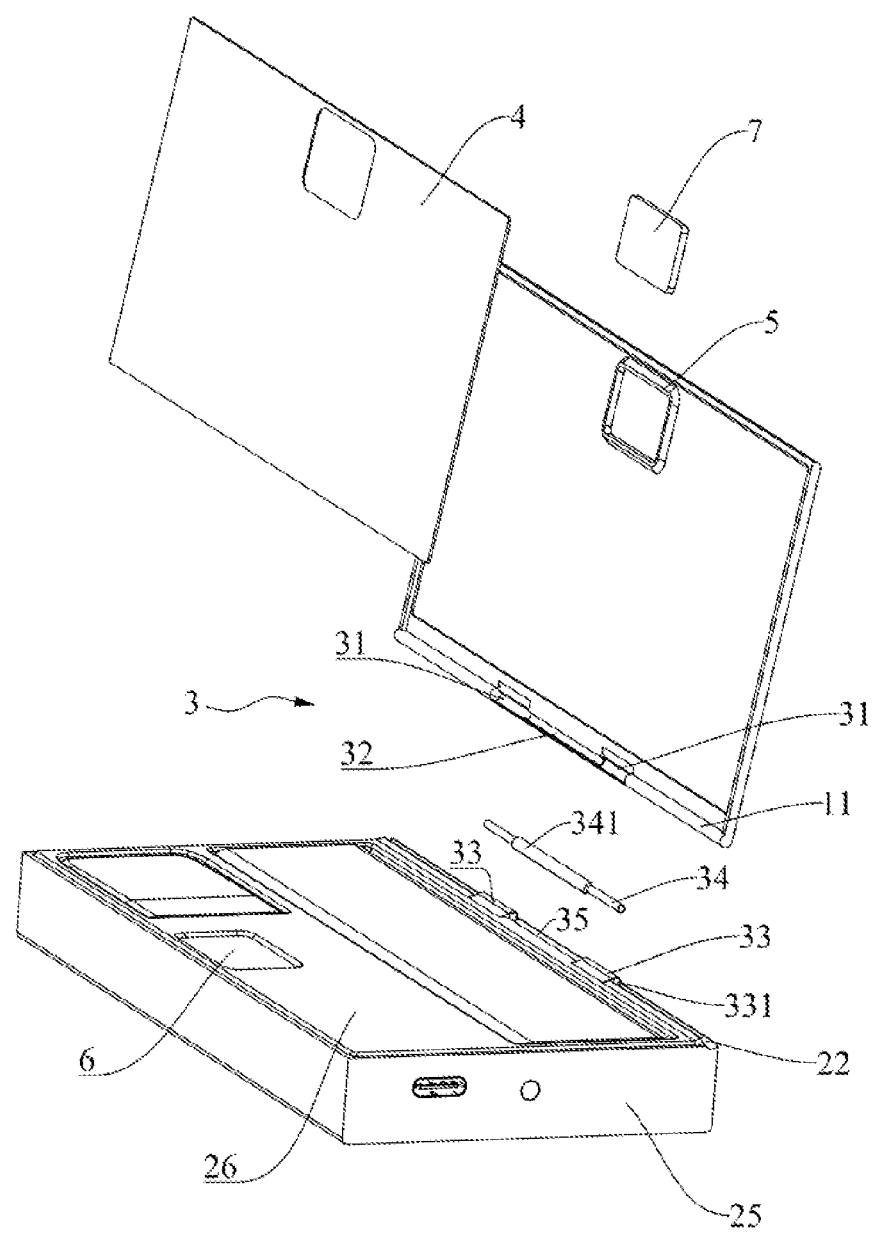
FIG. 3 is an exploded view of a charging case according to embodiments of the present disclosure.
Figure 4:
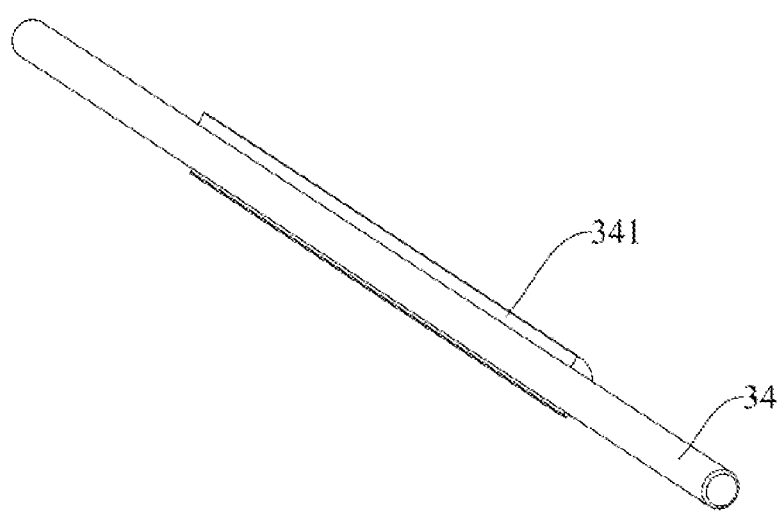
FIG. 4 is a schematic view illustrating the structure of a rotation shaft according to embodiments of the present disclosure.
Figure 5:
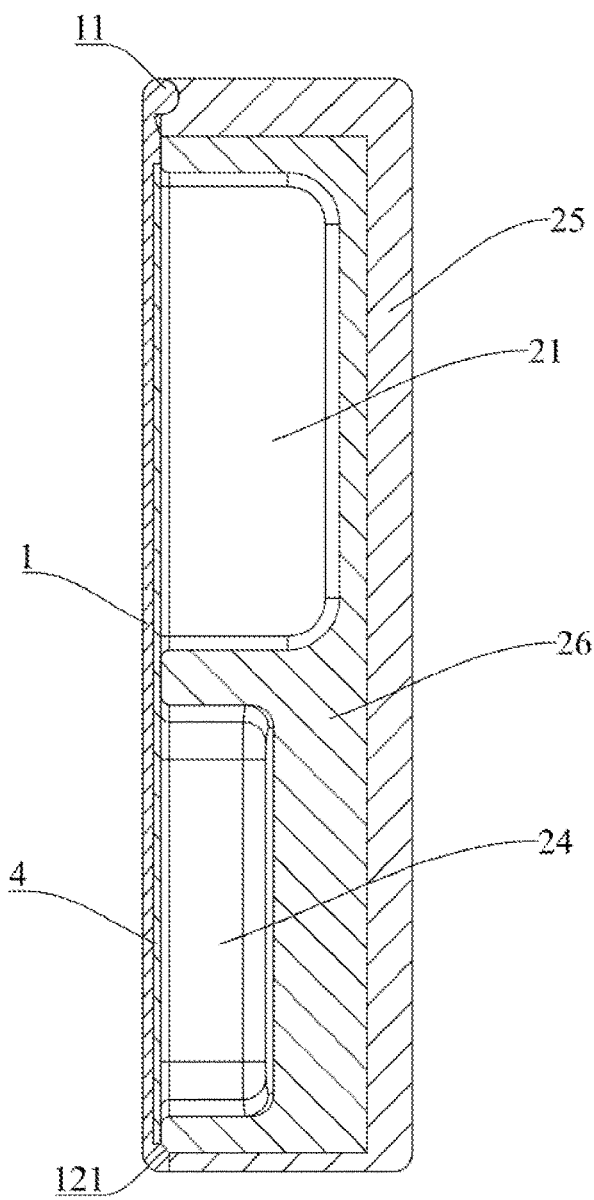
FIG. 5 is a section view of a charging case according to embodiments of the present disclosure.

As shown in FIG. 3, the connection assembly 3 in the present embodiments includes connection protrusions 33 and a rotation shaft 34. Moreover, one of the cover 1 and the case body 2 is provided with a first groove 31 and a second groove 32, and the connection protrusions 33 are secured to and is disposed on the other of the cover 1 and the case body 2. In other words, the first groove 31 and the second groove 31 are disposed on the one of the cover 1 and the case body 2, and the connection protrusions 33 are secured to and are disposed on the other of the cover 1 and the case body 2.

The connection protrusions 33 are rotatably disposed in the first groove 31. In some embodiments, a surface of each of the connection protrusions 33 is circularly arced and the first groove 31 is arced so that the connection protrusions 33 are rotatable in the first groove 31. Each connection protrusion 33 is provided with a through hole 331. An end of the rotation shaft passes through and is rotatable in the through hole 331. In an embodiment, as shown in FIG. 3, the middle of the rotation shaft 34 is provided with a bump 341. In some embodiments, the bump 341 is semi-encircledly disposed in the middle of the rotation shaft 34. Moreover, a part of the middle of the rotation shaft 34 is rotatably disposed in the second groove 32, where the part of the middle of the rotation shaft 34 is not provided with the bump 341. Exemplarily, the second groove 32 is arced so that the rotation shaft 34 is rotatable in the second groove 32. The bump 341 is located outside the second groove 32 so that the cover 1 can control the rotation shaft 34 to rotate through the bump 341 in the rotation process of the cover 1 relative to the case body 2.

In the charging case provided in the present embodiments, the first groove 31 is disposed such that the connection protrusions 33 can be accommodated in the first groove 31 and the cover 1 or the case body 2 can envelop the connection protrusions 33, and thus the connection protrusions 33 can be prevented from being exposed outside. The second groove 32 is disposed such that the part of the middle of the rotation shaft 34 can be accommodated in the second groove 32 and the ends of the rotation shaft 34 can be accommodated in the connection protrusions 33, and thus the cover 1 or the case body 2 can envelop the rotation shaft 34, enabling a seamless connection between the cover 1 and the case body 2. In this manner, a gap caused by the disposed the connection assembly 3 does not occur when the charging case is open or closed so that the possibility that impurities such as dust enter the charging case can be reduced and thus the cleanness of an object in the charging case can be ensured.

Moreover, the bump 341 is disposed in the middle of the rotation shaft 34 so that the rotatable connection between the cover 1 and the case body 2 can be implemented and thus the charging case can have a simple structure and a low cost.

To improve the rotation stability of the cover 1 relative to the case body 2, as shown in FIG. 3, two first grooves 31 and two connection protrusions 33 are provided in this embodiment. The two first grooves 31 are in one-to-one correspondence with the two connection protrusions 33. Moreover, the connection protrusions 33 are rotatably disposed in the corresponding first grooves 31. The two first grooves 31 are located at two sides of the second groove 32 and communicate with the second groove 32. Two ends of the rotation shaft 34 pass through the through holes disposed in the two connection protrusions 33. Optionally, to further improve the rotation stability of the cover 1 relative to the case body 2, a plurality of the connecting assemblies 3 may be provided. The plurality of the connecting assemblies 3 are uniformly and at intervals disposed in the connecting part between the cover 1 and the case body 2.

Optionally, with continued reference to FIG. 3, the first groove 31 and the second groove 32 are both provided at a first edge of the cover 1. The first edge can be construed as a lower edge of the cover 1. Moreover, a part of the first edge is provided with a circularly arced protrusion 11, where the part of the first edge is not provided with the first groove 31 and the second groove 32. The connection protrusion 33 is disposed at a second edge of the case body 2, and the second edge is provided with an arced groove 22. The arced protrusion 11 is rotatably disposed in the arced groove 22. In an embodiment, a surface of the arced protrusion 11 fully contacts with a surface of the arced groove 22. Thus, a part of the cover 1 and a part of the case body 2 can be seamlessly connected to each other, where the part of the cover 1 and the part of the case body 2 are not provided with the connection assembly 3, further improving the seal performance of the charging case that is closed.

In an embodiment, as shown in FIG. 3, the second edge is further provided with a third groove 35 which is located between the two connection protrusions 33. The bump 341 on the rotation shaft 34 is disposed in the third groove 35. The disposition of the third groove 35 enables the cover 1 and the case body 2 to better envelop the rotation shaft 34, further reducing the possibility that impurities such as dust enter the charging case.

Figure 6:
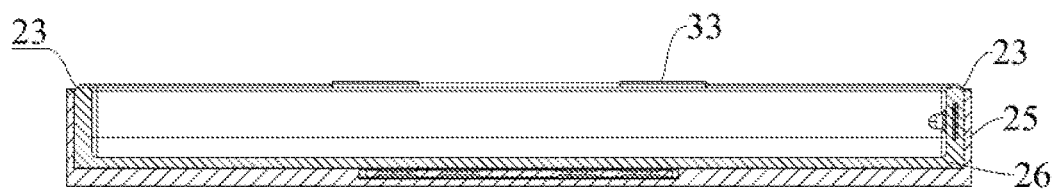
FIG. 6 is a section view of a charging case whose cover is not shown according to embodiments of the present disclosure.
Figure 7:
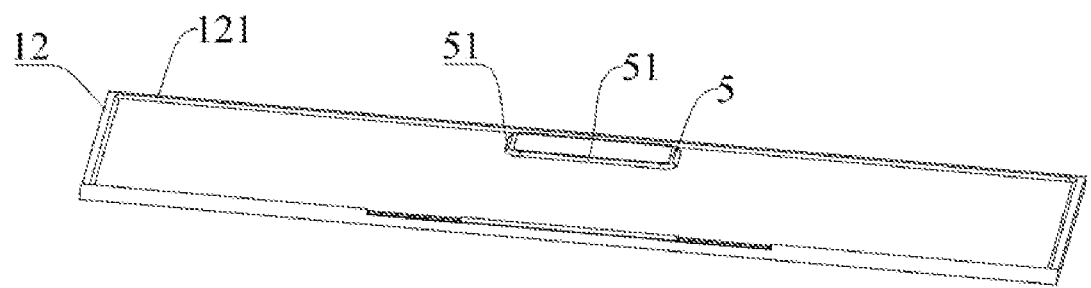
FIG. 7 is a schematic view illustrating the structure of a cover and the structure of a reset protrusion according to embodiments of the present disclosure.

Optionally, the charging case provided in the present embodiments is further provided with a function of guiding the cover 1. In an embodiment, as shown in FIG. 7, an edge of the cover 1 is provided with a first guide structure 12. As shown in FIG. 6, an edge of the case body 2 is provided with a second guide structure 23 which matches the first guide structure 12. When the cover 1 covers the case body 2, the second guide structure 23 can guide the movement of the first guide structure 12 so as to prevent a mismatch when the cover 1 covers the case body 2. In this manner, the cover 1 can be opened and closed accurately.

In an embodiment, the first guide structure 12 is secured to an inner wall surface of the cover 1 along a circumferential direction of the cover 1 and is provided with a first inclined surface 121 facing the center of the cover 1. The first guide structure 12 is a bump relative to the inner wall of the cover 1. In some embodiments, the first guide structure 12 is disposed at a preset edge of the cover 1. The preset edge of the cover 1 is the edge of the cover 1 except for the first edge. It is to be noted that the inclination direction is configured in a manner that the end of the first inclined surface 121 abutting the inner wall surface of the cover 1 is closer to the center of the cover 1 than the other end of the first inclined surface 121. The center of the cover 1 can be construed as the geometric center of the cover 1.

As shown in FIG. 6, a top edge of the case body 2 is provided with a second inclined surface which forms the second guide structure 23. When the cover 1 covers the case body 2, the first inclined surface 121 makes a surface-to-surface contact with the second inclined surface, and the first inclined surface 121 slides on the second inclined surface so as to guide the cover 1. The first inclined surface 121 and the second inclined surface are disposed such that an edge of the cover 1 not provided with the connection assembly 3 and an edge of the case body 2 not provided with the connection assembly 3 can be seamlessly connected to each other, further improving the seal performance of the charging case that is closed.

Optionally, in the present embodiments, the case body 2 further includes a shell 25 and an inner case 26. The shell 25 is slotted and the inner case 26 is accommodated in the shell 25. The inner case 26 is provided with a charging recess 21. The connection protrusion 33 and the third groove 35 are disposed at an edge of the inner case 26. The arced groove 22 is disposed at an edge of the shell 25. A top edge of the inner case 26 is provided with the second guide structure 23. A bottom of the second guide structure 23 extends to a top of the shell 25. When the charging case is closed, the first inclined surface 121 completely conforms to the second inclined surface and a top surface of the first guide structure 12 completely conforms to a top surface of the shell 25 so that the charging case can be sealed completely.

Figure 2:
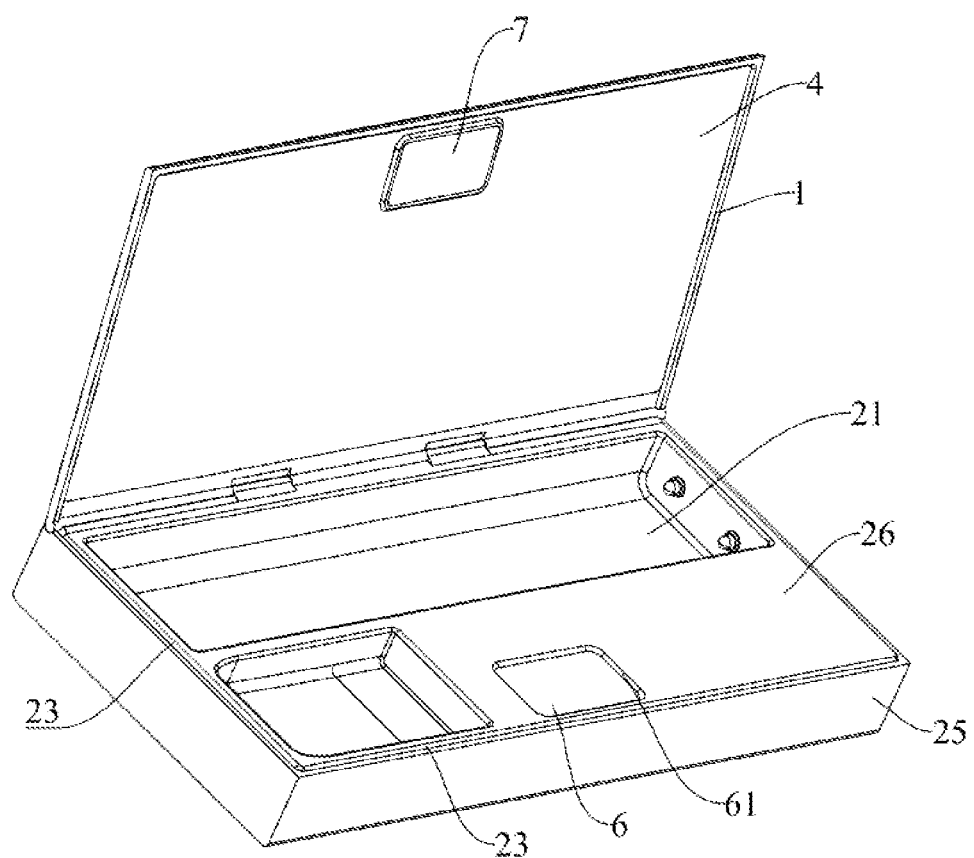
FIG. 2 is a schematic view of a charging case that is open according to embodiments of the present disclosure.

In the present embodiments, as shown in FIGS. 2 to 3, the charging case further includes a shockproof layer 4 secured to the inner wall of the cover 1. The shockproof layer 4 bypasses the first guide structure 12. In an embodiment, the shockproof layer 4 is located in a space surrounded by the first guide structure 12 and the arced protrusion 11. Moreover, the thickness of the shockproof layer 4 is greater than or equal to the thickness of the first guide structure 12 so that the shockproof layer 4 can create a good effect of cushioning in the falling process of the cover 1, thus reducing the abnormal noise generated by the collision between the cover 1 and the case body 2. In some embodiments, the material of the shockproof layer 4 is resilient material such as silica gel and rubber, so as to have a better effect of cushioning.

Optionally, with continued reference to FIGS. 2 to 3, one of the cover 1 or the case body 2 is provided with a reset protrusion 5, and the other of the cover 1 or the case body 2 is provided with a reset groove 6 capable of accommodating the reset protrusion 5. When the charging case is closed, the reset protrusion 5 is located in the reset groove 6. In an embodiment, an outer side surface 51 of the reset protrusion 5 and an inner sidewall surface 61 of the reset groove 6 are each an inclined surface. When the reset protrusion 5 is located in the reset groove 6, the outer side surface 51 of the reset protrusion 5 contacts and completely conforms to the inner sidewall surface of the reset groove 6. During the process when the cover 1 covers the case body 2, the inner sidewall surface 61 can guide the outer side surface 51, further ensuring the accurate closure of the cover 1 and the case body 2 and thus ensuring the reset of the cover 1 on the case body 2. In the present embodiments, FIG. 2 is the schematic view illustrating that the reset protrusion 5 is disposed on the cover 1 and that the reset groove 6 is disposed on the inner case 26. In some embodiments, the reset groove 6 may be a rectangular groove and the reset protrusion 5 may be a square block so as to assist the alignment of the cover 1 with the case body 2 in all directions.

In an embodiment, as shown in FIG. 3, the reset protrusion 5 is ringlike. Moreover, the charging case further includes a first magnetic block 7 disposed in the reset protrusion 5 and a second magnetic block 8 secured to the case body 2 or the cover 1. The first magnetic block 7 is attractable to the second magnetic block 8 so as to assist the reset protrusion 5 to better accommodate in the reset groove 6 and thus to facilitate the magnetic reset of the cover 1 and the case body 2. In addition, the first magnetic block 7 and the second magnetic block 8 are disposed such that the fastening strength of the cover 1 and the case body 2 can be improved, the cover 1 and the case body 2 are not easy to separate, and thus an object inside the charging case can be prevented from falling. In the present embodiments, the first magnetic block 7 and the reset protrusion 5 are both disposed on the cover 1 and the first magnetic block 7 is secured to the inner wall of the cover 1. The second magnetic block 8 is embedded in the case body 2 and is located directly below the reset groove 6. Alternatively, the second magnetic block 8 is secured at the bottom of the reset groove 6.

Figure 8:
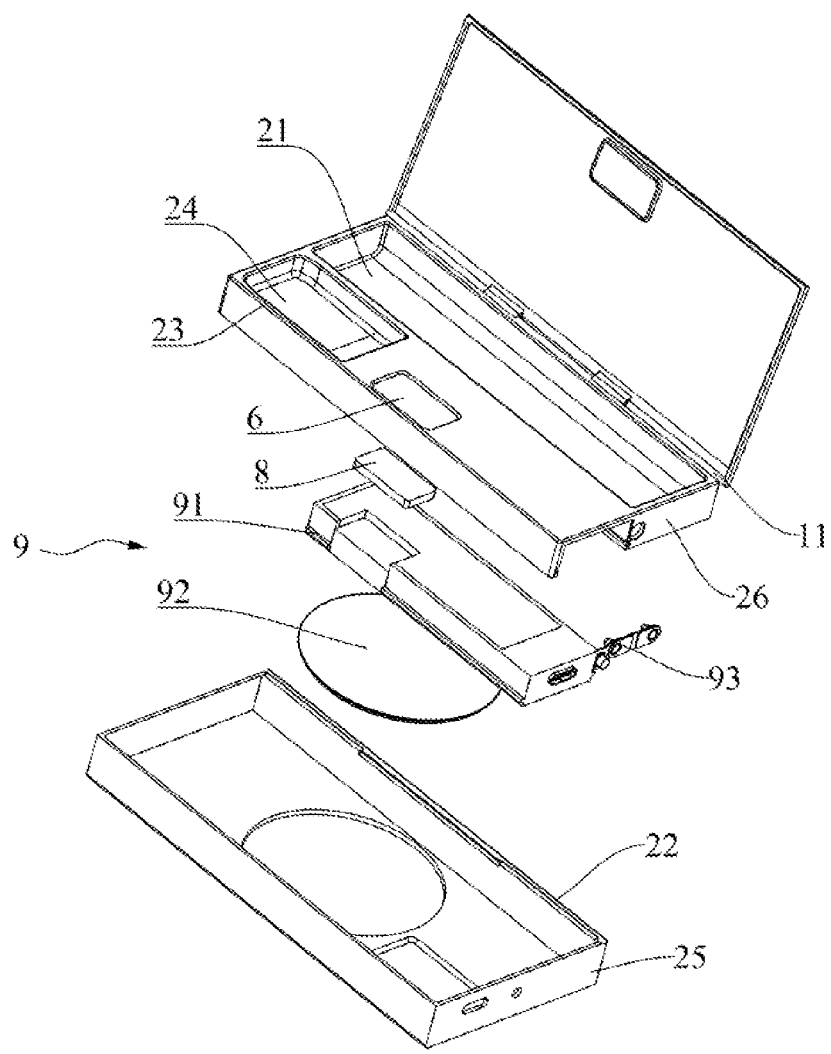
FIG. 8 is another exploded view of a charging case according to embodiments of the present disclosure.

Optionally, as shown in FIG. 8, a top surface of the case body 2 is provided with a disinfection recess 24 which can be used for accommodating an object to be disinfected. Exemplarily, the disinfection recess 24 itself has a disinfection function. For example, a sidewall of the disinfection recess 24 is coated with a coating that can sterilize and disinfect, such as silver. Alternatively, the disinfection recess 24 may be provided with a disinfection assembly and thus can disinfect the object to be disinfected through the disinfection assembly. The disinfection assembly may be, for example, an electronic heating assembly, an infrared emitter or an ultraviolet emitter. Moreover, the object to be disinfected may be a cartridge 40. When the disinfection assembly is the electronic heating assembly, the cartridge 40 can be disinfected by heating the electronic heating assembly; when the disinfection assembly is the infrared emitter or the ultraviolet emitter, the cartridge 40 can be disinfected by infrared light or ultraviolet light.

Figure 9:
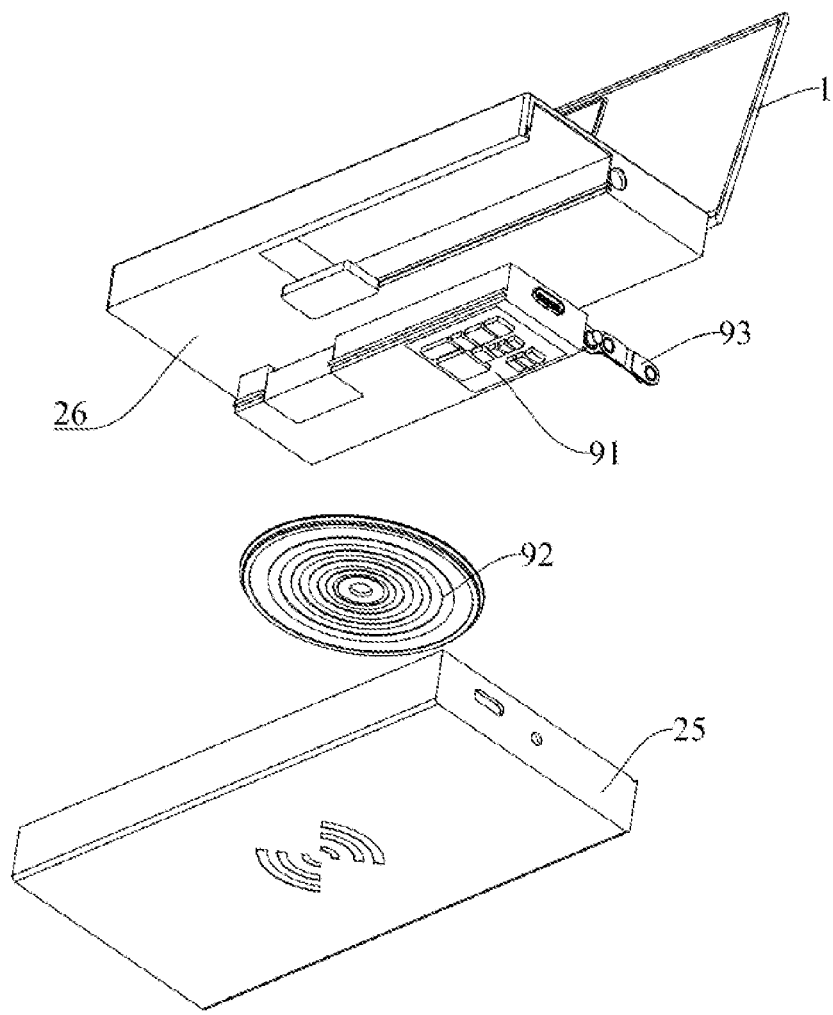
FIG. 9 is another exploded view of a charging case according to embodiments of the present disclosure.
Figure 10:
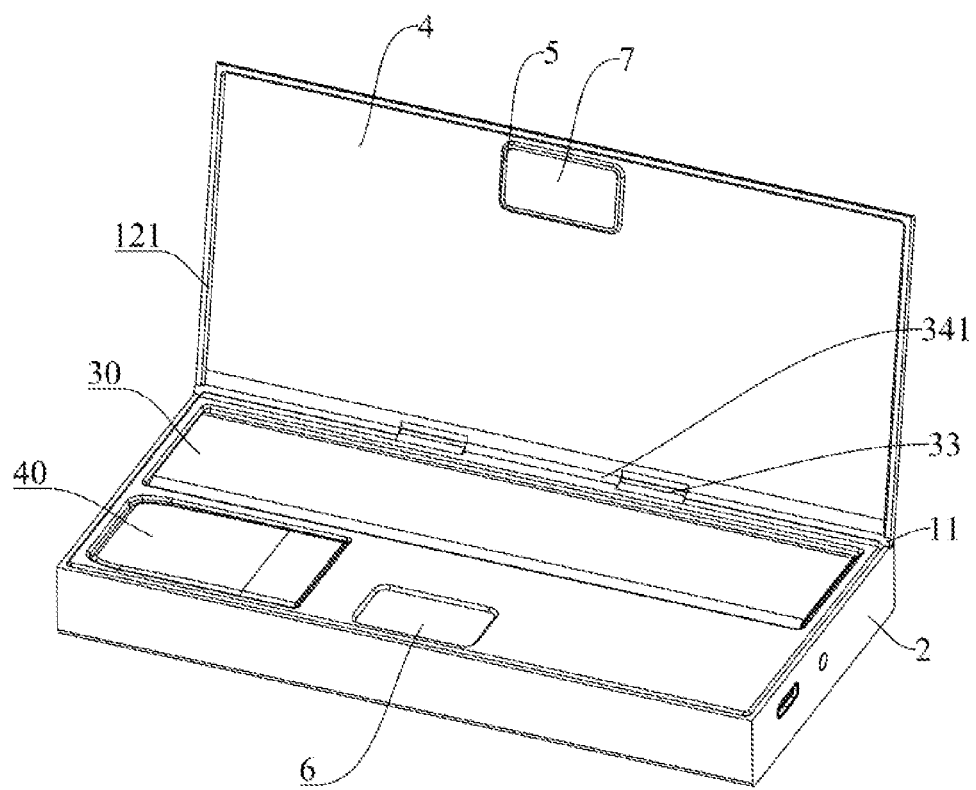
FIG. 10 is a reference view of a charging case in use according to embodiments of the present disclosure.

As shown in FIGS. 8 to 9, the charging case further includes a charging assembly 9 disposed in the case body 2. In an embodiment, the charging assembly 9 is disposed in the inner case 26. In an embodiment, the charging assembly 9 includes a circuit board 91, a battery module, a wireless charging module 92 and a charging terminal 93. The battery module, the wireless charging module 91 and the charging terminal 93 are electrically connected to the circuit board 91. The bottom of the inner case 26 is provided with an embedding slot in which the circuit board 91 is located. The wireless charging module 92 is disposed between the bottom of the inner case 26 and the shell 25. In some embodiments, the wireless charging module 92 may be embedded in the slot. The charging terminal 93 is secured in the charging recess 21 so as to charge the object in the charging recess 21. The wireless charging module 92 is disposed such that the charging case can be used as a power source to wirelessly charge electronic products such as an intelligent wearable device and can be charged through other wireless charging power sources. In this configuration, the multifunctionality and convenience of the charging case can be improved. It is to be noted that for the structure of the wireless charging module in the present embodiments, reference may be made to the related art. As shown in the figures, the wireless charging module includes a wireless charging induction coil and an induction coil heat shield.

Optionally, as shown in FIG. 1, the charging case further includes a charging connector 20 and a working indicator lamp 10. The charging connector 20 is electrically connected to the circuit board 91 or the battery module. The battery module can be charged through the charging connector 20. The working indicator lamp 10 is used for indicating the working states of the charging case, such as the power storage condition of the battery module and the charging condition of an object in the charging recess 21.

In the charging case provided in the present disclosure, the first groove is disposed such that the connection protrusions can be accommodated in the first groove and the cover or the case body can envelop the connection protrusions, and thus the connection protrusions can be prevented from being exposed outside. The second groove is disposed such that the part of the middle of the rotation shaft can be accommodated in the second groove and the ends of the rotation shaft can be accommodated in the connection protrusions, and thus the cover or the case body can envelop the rotation shaft, enabling a seamless connection between the cover and the case body. In this manner, a gap caused by the disposed connection assembly does not occur when the charging case is open or closed so that the possibility that impurities such as dust enter the charging case can be reduced and thus the cleanness of an object in the charging case can be ensured.

Moreover, the bump is disposed in the middle of the rotation shaft so that the rotatable connection between the cover and the case body can be implemented and thus the charging case can have a simple structure and a low cost.

What is claimed is:

1. A charging case, comprising:
    a cover;
    a case body provided with a charging recess; and
    a connection assembly comprising connection protrusions and a rotation shaft,
    wherein the cover is provided with the connection protrusions, and the case body is provided with a first groove and a second groove; or, the case body is provided with the connection protrusions, and the cover is provided with a first groove and a second groove,
    wherein the connection protrusions are provided with through holes respectively, each end of the rotation shaft passes through a respective one of the through holes, a middle of the rotation shaft is provided with a bump, the bump partially surrounds the rotation shaft in a circumferential direction of the rotation shaft, a part of the middle of the rotation shaft is rotatably disposed in the second groove, wherein the part of the middle of the rotation shaft is not provided with the bump, and the bump is located outside the second groove, wherein the first groove and the second groove are provided at a first edge of the cover, a part of the first edge is provided with an arced protrusion, the part of the first edge is not provided with the first groove and the second groove, and the connection protrusions are disposed at a second edge of the case body, the second edge is provided with an arced groove, and the arced protrusion is located in the arced groove.

2. The charging case according to claim 1, wherein an edge of the cover is provided with a first guide structure, an edge of the case body is provided with a second guide structure matching the first guide structure, and when the cover covers the case body, the second guide structure is able to guide the first guide structure.

3. The charging case according to claim 2, wherein the first guide structure is secured to an inner wall surface of the cover along a circumferential direction of the cover and is provided with a first inclined surface facing a center of the cover.

4. The charging case according to claim 3, wherein a top edge of the case body is provided with a second inclined surface which forms the second guide structure, and when the cover covers the case body, the first inclined surface is configured to slide on the second inclined surface.

5. The charging case according to claim 2, further comprising a shockproof layer secured to an inner wall of the cover, wherein the shockproof layer is configured to bypass the first guide structure, and a thickness of the shockproof layer is greater than or equal to a thickness of the first guide structure.

6. The charging case according to claim 1, wherein an edge of the cover is provided with a first guide structure, an edge of the case body is provided with a second guide structure matching the first guide structure, and when the cover covers the case body, the second guide structure is able to guide the first guide structure.

7. The charging case according to claim 6, wherein the first guide structure is secured to an inner wall surface of the cover along a circumferential direction of the cover and is provided with a first inclined surface facing a center of the cover.

8. The charging case according to claim 7, wherein a top edge of the case body is provided with a second inclined surface which forms the second guide structure, and when the cover covers the case body, the first inclined surface is configured to slide on the second inclined surface.

9. The charging case according to claim 6, further comprising a shockproof layer secured to an inner wall of the cover, wherein the shockproof layer is configured to bypass the first guide structure, and a thickness of the shockproof layer is greater than or equal to a thickness of the first guide structure.

10. The charging case according to claim 1, wherein the cover is provided with a reset protrusion, the case body is provided with a reset groove capable of accommodating the reset protrusion, an outer side surface of the reset protrusion and an inner sidewall surface of the reset groove are each an inclined surface, and when the reset protrusion is located inside the reset groove, the outer side surface of the reset protrusion is configured to contact the inner sidewall surface of the reset groove.

11. The charging case according to claim 6, wherein the reset protrusion is ringlike, and the charging case further comprises a first magnetic block disposed in the reset protrusion and a second magnetic block secured to the case body, and the first magnetic block is attractable to the second magnetic block.

12. The charging case according to claim 1, wherein the case body is provided with a reset protrusion, the cover is provided with a reset groove capable of accommodating the reset protrusion, an outer side surface of the reset protrusion and an inner sidewall surface of the reset groove are each an inclined surface, and when the reset protrusion is located inside the reset groove, the outer side surface of the reset protrusion is configured to contact the inner sidewall surface of the reset groove.

13. The charging case according to claim 6, wherein the reset protrusion is ringlike, and the charging case further comprises a first magnetic block disposed in the reset protrusion and a second magnetic block secured to the cover, and the first magnetic block is attractable to the second magnetic block.

14. The charging case according to claim 1, wherein the case body is further provided with a disinfection recess.

15. The charging case according to claim 1, further comprising a charging assembly disposed in the case body, wherein the charging assembly comprises a circuit board, a battery module, a wireless charging module and a charging terminal, the battery module, the wireless charging module and the charging terminal are electrically connected to the circuit board, and the charging terminal is secured in the charging recess.

* * * * *